US012215754B2

(12) United States Patent
Kadokura (10) Patent No.: US 12,215,754 B2
(45) Date of Patent: Feb. 4, 2025

(54) SHOCK ABSORBER (71) Applicant: Hitachi Astemo, Ltd., Hitachinaka (JP)

(72) Inventor: Kosuke Kadokura, Hitachinaka (JP)

(73) Assignee: HITACHI ASTEMO, LTD., Ibaraki (JP)

(*) Notice: Subject to any disclaimer, the term of this patent is extended or adjusted under 35 U.S.C. 154(b) by 374 days.

(21) Appl. No.: 17/798,419

(22) PCT Filed: Feb. 9, 2021

(86) PCT No.: PCT/JP2021/004726
§ 371 (c)(1),
(2) Date: Aug. 9, 2022

(87) PCT Pub. No.: WO2021/161980
PCT Pub. Date: Aug. 19, 2021

(65) Prior Publication Data
US 2023/0070735 A1 Mar. 9, 2023

(30) Foreign Application Priority Data
Feb. 14, 2020 (JP) ................. 2020-023409

(51) Int. Cl.
F16F 9/46 (2006.01)
F16F 9/348 (2006.01)
(52) U.S. Cl.
CPC ............ F16F 9/465 (2013.01); F16F 9/348 (2013.01)
(58) Field of Classification Search
CPC .. F16F 9/465; F16F 9/348; F16F 9/185; F16F 9/46
See application file for complete search history.

(56) References Cited

U.S. PATENT DOCUMENTS 6,155,391 A * 12/2000 Kashiwagi ............ F16F 9/466
188/266.6
2016/0195152 A1 7/2016 Mori et al.
2018/0259031 A1 9/2018 Kobayashi

FOREIGN PATENT DOCUMENTS

JP 2017-057864 3/2017
JP 2019-173786 10/2019
WO 2015/020227 2/2015

OTHER PUBLICATIONS

Japanese Patent No. JP 2012215227 to Ohara et al published on Nov. 8, 2012.*
Japanese Patent No. JP 2014009760 to Mori published on Jan. 20, 2014.*
Japanese Patent No. JP 2015197106 to Mori et al published on Nov. 9, 2015.*
Japanese Patent No. JP 2015197126 to Yamashita et al published on Nov. 9, 2015.*

(Continued)

Primary Examiner — Pamela Rodriguez
(74) Attorney, Agent, or Firm — Wenderoth, Lind & Ponack, L.L.P.

(57) ABSTRACT

A pin portion in which an introduction orifice leading to a back-pressure chamber is formed is disposed along inner peripheries of a main body, a main valve, and a pilot casing. A nut disposed on the pin portion is rotated relative to the pin portion to fasten the main body, the main valve, and the pilot casing together. This eliminates the necessity of machining a tool engagement portion in the pin portion and represses an increase in man-hours.

5 Claims, 5 Drawing Sheets

(56) References Cited

OTHER PUBLICATIONS

Office Action issued Jul. 10, 2024 in corresponding Japanese Patent Application No. 2023-062927, with English translation.
International Search Report issued Mar. 23, 2021 in International Application No. PCT/JP2021/004726, with English translation.
Written Opinion of the International Searching Authority issued Mar. 23, 2021 in International Application No. PCT/JP2021/004726, with English translation.

* cited by examiner

Fig. 5

SHOCK ABSORBER

TECHNICAL FIELD

The invention relates to shock absorbers, and more specifically, to damping force adjustable shock absorbers that control a hydraulic fluid flow generated by piston rod strokes and thus adjust a damping force.

BACKGROUND ART

Patent Literature 1 discloses a shock absorber (hereinafter, referred to as "conventional shock absorber") including a damping valve in which upstream valve components located between a mounting member 2 and a valve housing 4 are fastened together by rotating a mounting shaft 2c (pin member) of the mounting member 2 relative to the valve housing 4.

CITATION LIST

Patent Literature

PTL 1: Japanese Unexamined Patent Application Publication (Kokai) No. 2017-57864

SUMMARY OF INVENTION

Technical Problem

The conventional shock absorber requires that the mounting member 2 be machined to be provided with a tool engagement portion used for rotating the mounting shaft 2c (pin member) relative to the valve housing 4, and therefore requires man-hours for machining the mounting member 2.

An issue of the invention is to provide a shock absorber that represses an increase in man-hours.

Solution to Problem

The shock absorber according to the invention is a shock absorber comprising a cylinder in which a hydraulic fluid is sealed; a piston inserted in the cylinder to define two chambers within the cylinder; an outer tube disposed around an outer periphery of the cylinder; a reservoir formed between the cylinder and the outer tube, and in which the hydraulic fluid and gas are sealed; a connecting pipe disposed between the cylinder and the outer tube and communicating into the cylinder; and a damping force generation mechanism accommodated in a valve casing disposed on an outside of the outer tube, the damping force generation mechanism being connected to the connecting pipe. The damping force generation mechanism includes a main valve configured to generate a damping force; a seat member which the main valve abuts; a pilot casing that forms a back-pressure chamber formed on a back side of the main valve and having inner pressure that acts on the main valve in a valve-closing direction; a pilot valve configured to adjust the inner pressure of the back-pressure chamber; and a pin member that is disposed along inner peripheries of the seat member, the main valve, and the pilot casing, the pin member in which an introduction orifice leading to the back-pressure chamber is formed. The pin member is provided with a fastening member that is rotated relative to the pin member to fasten the seat member, the main valve, and the pilot casing together.

One embodiment of the invention makes it possible to repress an increase in man-hours for fabrication of the shock absorber.

DESCRIPTION OF EMBODIMENTS

First Embodiment

A first embodiment of the invention will be discussed with reference to the attached drawings. For the sake of convenience, a vertical direction in FIG. 1 is directly referred to as a "vertical direction." The left side (cylinder 2 side) in FIG. 2 is referred to as "one side," and the right side (opposite side to the cylinder 2 side) as "the other side."

Figure 1:
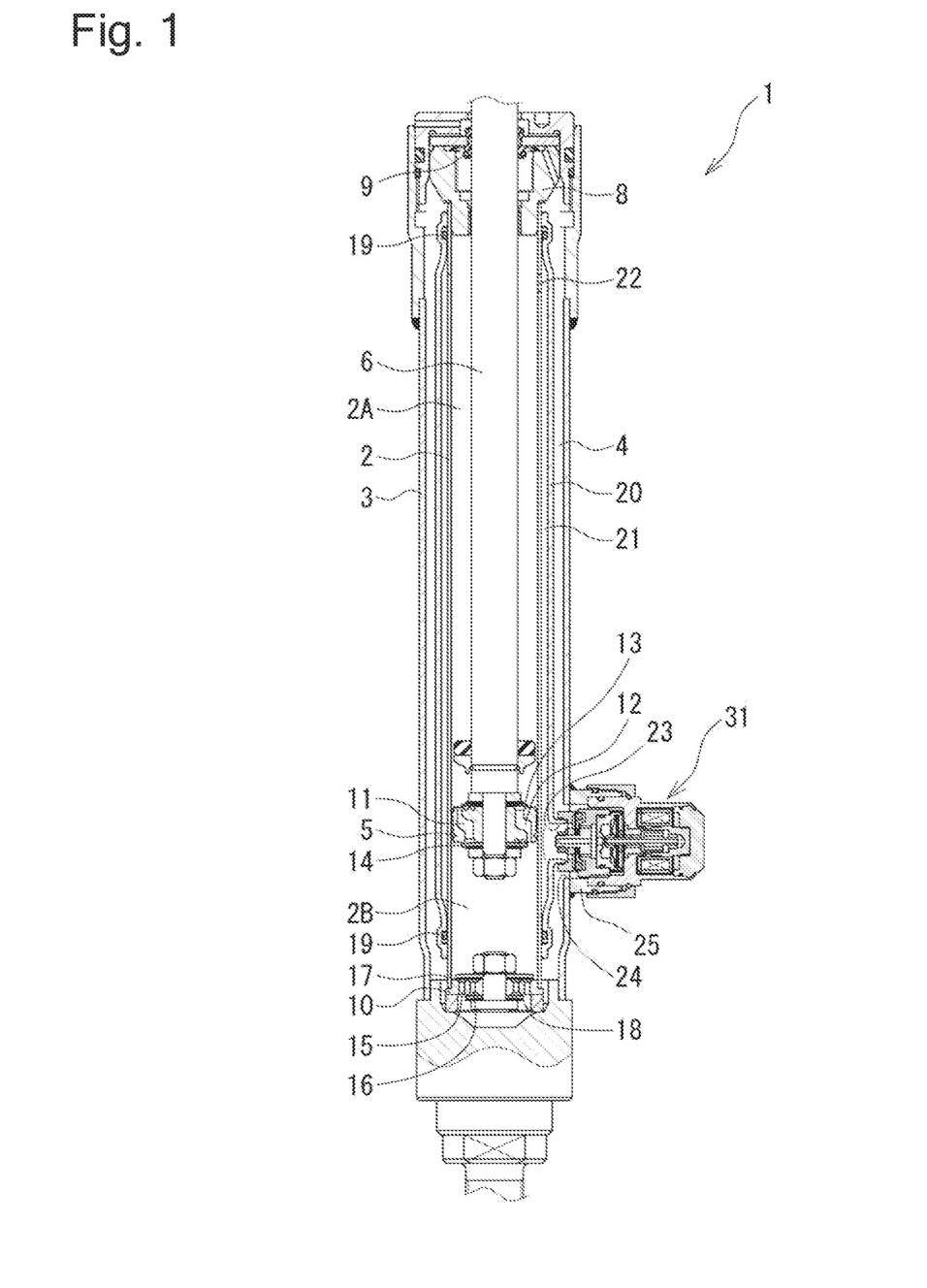
FIG. 1 is a sectional view of a damping force adjustable shock absorber according to a first embodiment.

As illustrated in FIG. 1, the first embodiment relates to a damping force adjustable hydraulic shock absorber 1 (hereinafter, referred to as "shock absorber 1") with a so-called horizontally-arranged control valve, in which a damping force adjustment mechanism 31 is horizontally arranged on a lateral wall of an outer tube 3. The shock absorber 1 has a multi-cylinder structure in which the cylinder 2 is disposed inside the outer tube 3, and a reservoir 4 is formed between the outer tube 3 and the cylinder 2. A piston 5 is slidably fitted in the cylinder 2. The piston 5 defines two chambers, namely, a cylinder's upper chamber 2A and a cylinder's lower chamber 2B, within the cylinder 2. Coupled to the piston 5 is a lower end portion of a piston rod 6. An upper end side of the piston rod 6 stretches through the cylinder's upper chamber 2A to extend through a rod guide 8 and an oil seal 9 which are mounted on an upper end portion of the cylinder 2 and of the outer tube 3 and protrudes outside the cylinder 2.

The piston 5 is provided with an expansion-side path 11 and a contraction-side path 12 which connect the cylinder's upper chamber 2A and the cylinder's lower chamber 2B. Disposed in the contraction-side path 12 is a check valve 13 that allows a hydraulic fluid to flow from the cylinder's lower chamber 2B to the cylinder's upper chamber 2A. Disposed in the expansion-side path 11 is a disc valve 14 that is opened when pressure on the cylinder's upper chamber 2A side reaches predetermined pressure and releases the pressure on the cylinder's upper chamber 2A side (allows the pressure on the cylinder's upper chamber 2A side to escape) to the cylinder's lower chamber 2B side.

The cylinder 2 includes a lower end portion provided with a base valve 10 which separates the cylinder's lower chamber 2B and the reservoir 4. The base valve 10 is provided with an expansion-side path 15 and a contraction-side path 16 which connect the cylinder's lower chamber 2B and the reservoir 4. Disposed in the expansion-side path 15 is a check valve 17 that allows the hydraulic fluid to flow from the reservoir 4 side to the cylinder's lower chamber 2B side. Disposed in the contraction-side path 16 is a check valve 18 that is opened when pressure on the cylinder's lower chamber 2B side reaches predetermined pressure and releases the pressure on the cylinder's lower chamber 2B side (allows the pressure on the cylinder's lower chamber 2B side to escape) to the reservoir 4 side. The hydraulic fluid is sealed in the cylinder 2, and the hydraulic fluid and gas are sealed in the reservoir 4.

A separator tube 20 (connecting pipe) is mounted around an outer periphery of the cylinder 2 with a pair of upper and lower seal members 19, 19 intervening therebetween. An annular channel 21 is formed between the cylinder 2 and the separator tube 20. The annular channel 21 is in communication with the cylinder's upper chamber 2A through a path 22 disposed in an upper end-side lateral wall of the cylinder 2. The separator tube 20 is provided with a cylindrical connection 23 in a lower end-side lateral wall thereof. The cylindrical connection 23 protrudes sideways and opens at a distal end thereof. The outer tube 3 is provided with an attachment hole 24 in the lateral wall thereof at a position facing the connection 23. The attachment hole 24 is arranged coaxially with the connection 23 and has an inner diameter that is larger than an outer diameter of the connection 23. A substantially cylindrical valve casing 25 is disposed on the lateral wall of the outer tube 3 so as to surround the attachment hole 24. The damping force adjustment mechanism 31 is accommodated in the valve casing 25.

Figure 2:
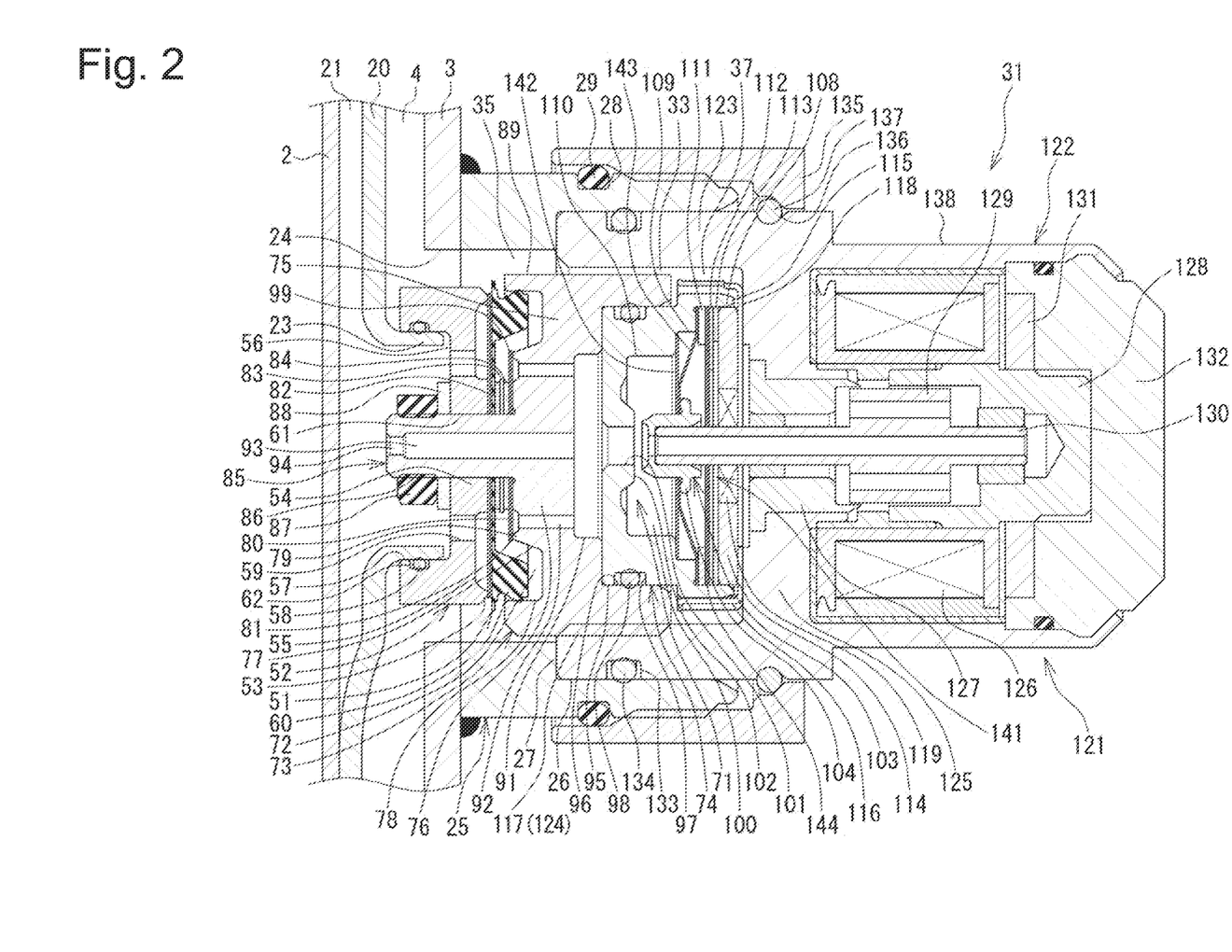
FIG. 2 is an enlarged view of a damping force adjustment mechanism illustrated in FIG. 1.

As illustrated in FIG. 2, the damping force adjustment mechanism 31 includes a main valve 51 of a back-pressure type which generates a damping force, an annular main body 52 (seat member) which the main valve 51 abuts, a back-pressure chamber 72 formed on the back side of the main valve 51 and having inner pressure that acts on the main valve 51 in a valve-closing direction, a pilot casing 73 that forms the back-pressure chamber 72, a pilot valve 71 that adjusts the inner pressure of the back-pressure chamber 72 to control a valve-opening pressure of the main valve 51, a pilot body 74 which the pilot valve 71 abuts, a fail-safe valve 141 disposed on a downstream side of the pilot valve 71, and a solenoid 121 that controls a valve-opening pressure of the pilot valve 71.

An annular seat portion 53 is formed in an outer edge portion of the other side end surface ("right-side end surface" in FIG. 2) of the main body 52. An outer edge portion of the main valve 51 detachably abuts the annular seat portion 53. An annular recess portion 55 is formed on an inner periphery side of the seat portion 53, that is, an upstream side of the main valve 51. Formed in a one side end surface ("left-side end surface" in FIG. 2) of the main body 52 is a recess portion 56 in which the connection 23 of the separator tube 20 is fitted (inserted). The recess portion 56 includes an inner peripheral surface 57 comprising an inside cylinder surface that is coaxial with the main body 52.

Formed in the inner peripheral surface 57 of the main body 52 (recess portion 56) is an annular groove 62. A seal ring 58 attached in the annular groove 62 seals a gap between the inner peripheral surface 57 of the main body 52 and the connection 23 of the separator tube 20. The recess portion 56 on one side of the main body 52 and the annular recess portion 55 on the other side of the main body 52 are in communication with each other through a plurality of paths 59 extending along an axial direction of the main body 52 (axial direction of the connection 23, that is, a right-and-left direction in FIG. 2).

An inner peripheral portion of the main valve 51 having a disc-like shape is held between an inner peripheral portion 54 of the main body 52 and an inner peripheral portion 76 of a bottom portion 75 of the pilot casing 73 that is formed to have a substantially bottomed cylinder-like shape. An annular packing 60 (elastic seal member) is joined to a rear surface side of an outer peripheral portion of the main valve 51. An annular recess portion 77 forming the back-pressure chamber 72 is formed in a one side end surface ("left-side end surface" in FIG. 2) of the pilot casing 73 (bottom portion 75). An outer periphery-side wall surface of the annular recess portion 77 comprises an inside cylindrical surface that is coaxial with an axis line (center line) of the pilot casing 73. The outer periphery-side wall surface of the annular recess portion 77 comprises an inside cylinder surface that is coaxial with an axis (center line) of the pilot casing 73. The outer periphery-side wall surface is a sliding surface 78 of the packing 60 of the main valve 51.

An annular seat portion 79 is formed in an inner edge portion of the annular recess portion 77 in the one side end surface of the pilot casing 73. An outer edge portion of a disc-like back-pressure introduction valve 81 detachably abuts the seat portion 79. An annular recess portion 80 is formed between the inner peripheral portion 76 and the seat portion 79 in the one side end surface of the pilot casing 73, that is, in the other side of the back-pressure introduction valve 81.

An inner peripheral portion of the back-pressure introduction valve 81 is held between the inner peripheral portion 54 of the main body 52 and the inner peripheral portion 76 of the pilot casing 73. Interposed between the inner peripheral portion 54 of the main body 52 and the inner peripheral portion 76 of the pilot casing 73 are the inner peripheral portion of the main valve 51, a retainer 82, a spacer 83, a retainer 84, and the back-pressure introduction valve 81 in the order from the one side to the other side. A pin portion 85 (pin member) formed integrally with the pilot casing 73 extends through axial bores of the main valve 51, the retainer 82, the spacer 83, the retainer 84, and the back-pressure introduction valve 81.

The pin portion 85 is disposed coaxially with the pilot casing 73 and protrudes from the bottom portion 75 of the pilot casing 73 to the cylinder 2 side (left side in FIG. 2). The pin portion 85 extends through an axial bore 61 of the main body 52. A one side end portion (distal end portion) of the pin portion 85 is located inside the recess portion 56 of the main body 52, that is, inside the connection 23. A thread portion 86 is formed in the one side end portion of the pin portion 85. A nut 87 (fastening member) is screwed on the thread portion 86. The nut 87 is therefore located (accommodated) inside the connection 23, that is, inside the recess portion 56 of the main body 52. The pin portion 85 may be a separate member from the pilot casing 73. In such a case, the pin portion 85 (pin member) is press-fitted into an axial bore (see "reference sign 105" in FIG. 4) that is formed in the pilot casing 73, to thereby combine the pilot casing 73 and the pin portion 85 in an integral manner.

Figure 3:
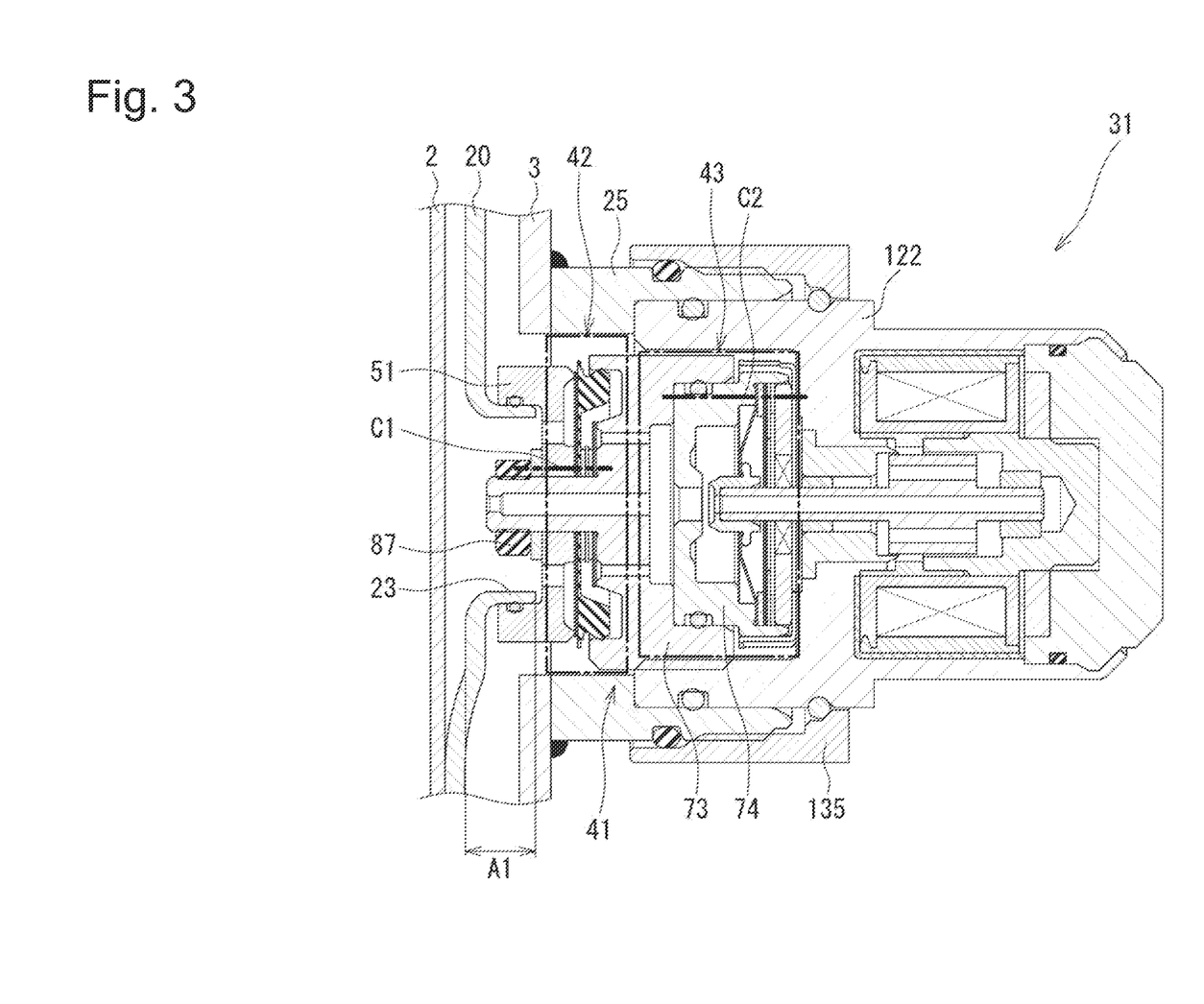
FIG. 3 is an explanatory view of the first embodiment which shows upstream and downstream valve components.

The nut 87 screwed on the thread portion 86 is fastened (rotated relative to the pin member), to thereby apply an axial force to a component (hereinafter, referred to as "upstream valve component 42"; see FIG. 3) located between a washer 88 and the pilot casing 73. The upstream valve component 42, according to the first embodiment, comprises the main body 52, the main valve 51, the retainer 82, the spacer 83, the retainer 84, and the back-pressure introduction valve 81. To fasten the nut 87, a tool is engaged with width across flats 89 (only one of the flats is illustrated in FIG. 2) which are formed in an outer peripheral surface of the pilot casing 73. Formed between the width across flats 89 of the pilot casing 73 on one hand and a yoke 122 on the other is a path 33 discussed later.

A recess portion 91 is formed in a center of the other side end surface ("right-side end surface" in FIG. 2) of the bottom portion 75 of the pilot casing 73. The recess portion 91 is in communication with an annular recess portion 80 formed in the one side end surface of the pilot casing 73 through a plurality of paths 92 extending through the pilot casing 73 in the axial direction (right-and-left direction in FIG. 2). The recess portion 91 is in communication with the annular channel 21 through an axial bore 93 (introduction path) of the pin portion 85. Formed in a one side end portion of the axial bore 93, or a distal end portion of the pin portion 85, is an introduction orifice 94 leading to the back-pressure chamber 72. The hydraulic fluid in the annular channel 21 is introduced into the back-pressure chamber 72 through the introduction orifice 94, the axial bore 93, the recess portion 91, the paths 92, the annular recess portion 80, and the back-pressure introduction valve 81. Formed in an outer edge portion of the back-pressure introduction valve 81 is a plurality of orifices 99 normally connecting the back-pressure chamber 72 and the annular channel 21.

The pilot body 74 is formed to have a substantially bottomed cylinder-like shape, the other side of which is open. The pilot body 74 includes a small outer diameter portion 95 at one end thereof which is fitted in an inner peripheral surface 96 of the pilot casing 73. The pilot body 74 is axially positioned relative to the pilot casing 73 by abutting the bottom portion 75 of the pilot casing 73 with a one side end surface thereof. An annular groove 97 is formed in an outer peripheral surface of the small outer diameter portion 95 of the pilot body 74. A seal ring 98 is attached in the annular groove 97 to seal a gap between the inner peripheral surface 96 of the pilot casing 73 and the small outer diameter portion 95 of the pilot body 74.

Formed inside the pilot body 74 is a valve chamber 100 of the pilot valve 71 and the fail-safe valve 141. An axial bore 101 is formed in a center of the bottom portion of the pilot body 74. The hydraulic fluid introduced from the annular channel 21 via the introduction orifice 94 is introduced into the valve chamber 100 through the axial bore 101. An annular seat portion 102 is formed in the other side open edge portion of the axial bore 101. A valve body 103 of the pilot valve 71 detachably abuts the seat portion 102.

The valve body 103 is formed to have a substantially cylindrical shape. A one side end portion of the valve body 103 is formed to have a tapered shape. A spring bearing portion 104 in a shape of an outer flange is formed in the other side of the valve body 103. The valve body 103 is elastically supported by a pilot spring 142, a fail-safe spring 143, and a fail-safe disc 144 in an axially displaceable manner in a position facing the seat portion 102. The pilot spring 142 and the fail-safe spring 143 may be formed into a single non-linear spring.

Formed in an inner peripheral surface of the pilot body 74 are a first inner diameter portion 108, a second inner diameter portion 109, and a third inner diameter portion 110 which are decreased in inner diameter to have a staircase pattern from the other side (opening side) to the one side. A step portion (reference sign omitted) between the second inner diameter portion 109 and the third inner diameter portion 110 supports an outer peripheral portion of the pilot spring 142. A step portion (reference sign omitted) between the first inner diameter portion 108 and the second inner diameter portion 109 supports the fail-safe spring 143, a spacer 111, the fail-safe disc 144, a retainer 112, a spacer 113, and a washer 114 which are stacked within the first inner diameter portion 108.

An axial length of the first inner diameter portion 108 of the pilot body 74 is set smaller than stack height of the fail-safe spring 143, the spacer 111, the fail-safe disc 144, the retainer 112, the spacer 113, and the washer 114 stacked within the first inner diameter portion 108. The fail-safe spring 143, the spacer 111, the fail-safe disc 144, the retainer 112, the spacer 113, and the washer 114 in the first inner diameter portion 108 are fixed to the pilot body 74 by a cap 116 attached to a large outer diameter portion 115 on the other side of the pilot body 74.

A plurality of notches 118 are formed in the cap 116. The plurality of notches 118 brings the valve chamber 100 into communication with a channel 37 formed around an outer circumference of the cap 116. The valve chamber 100 is in communication with the reservoir 4 through an axial bore 119 of the washer 114, the notches 118 of the cap 116, the channel 37, the path 33 between the width across flats 89 of the pilot casing 73 on one hand and a cylindrical portion 123 of the yoke 122 on the other, and an annular channel 35 formed along the inner periphery of the valve casing 25, that is, along the outer periphery of the main body 52.

A thread portion 117 is formed in the outer peripheral surface of the pilot casing 73 in which the width across flats 89 are formed. The thread portion 117 (external thread) is screwed with a thread portion 124 (internal thread) that is formed in an inner peripheral surface of the cylindrical portion 123 on one side of the yoke 122. In this state, the pilot casing 73 and the yoke 122 are relatively rotated in a fastening direction of the thread portion 117 and the thread portion 124, to thereby fasten the pilot casing 73 and the yoke 122 together.

An axial force thus acts on a component (hereinafter, referred to as "downstream valve component 43"; see FIG. 3) between the pilot casing 73 and the yoke 122. The downstream valve component 43 comprises the pilot body 74, the pilot spring 142, the fail-safe spring 143, the spacer 111, the fail-safe disc 144, the retainer 112, the spacer 113, the washer 114, and the cap 116. To fasten the pilot casing 73 and the yoke 122 together, a tool is engaged with the width across flats 89 (only one of the flats is illustrated in FIG. 2) of the pilot casing 73 and width across flats 138 formed in an outer peripheral surface of the yoke 122.

A coil 126, a core 127, a core 128, a plunger 129, and a hollow activation rod 130 are secured to the other side of the yoke 122. The activation rod 130 is formed integrally with the plunger 129. The activation rod 130, however, may be a separate element. The valve body 103 of the pilot valve 71 is fixed to a one side end portion of the activation rod 130. A spacer 131 and a cover 132 are inserted in the other side end portion of the yoke 122. The other side edge portion of the yoke 122 is subjected to plastic working (swaging), to thereby apply the axial force to solenoid internal components located in the yoke 122.

The cylindrical portion 123 on the one side of the yoke 122 is fitted in a large inner diameter portion 26 that opens in the other side of the valve casing 25, whereby the yoke 122 is coupled to the valve casing 25. A one side end surface of the cylindrical portion 123 of the yoke 122 comes into abutment against a step portion 27 inside the valve casing 25. The yoke 122 is thus axially positioned relative to the valve casing 25. An annular groove 133 is formed in an outer peripheral surface of the cylindrical portion 123 of the yoke 122. A gap between the valve casing 25 and the cylindrical portion 123 of the yoke 122 is sealed by a seal ring 134 that is attached in the annular groove 133. To fix the yoke 122 to the valve casing 25, a nut 135 screwed on the valve casing 25 is fastened to compress a retaining ring 137 attached in the annular groove 136 of the yoke 122. An annular groove 28 is formed in an outer peripheral surface of the valve casing 25. A gap between the valve casing 25 and the nut 135 is sealed by a seal ring 29 that is attached in the annular groove 28.

When the coil 126 is not energized, the valve body 103 is biased by a spring force of the fail-safe spring 143 in such a direction that the valve body 103 is detached from the seat portion 102 ("rightward direction" in FIG. 2). The spring bearing portion 104 of the valve body 103 then abuts (is seated on) the fail-safe disc 144, making the fail-safe valve 141 closed. At this moment, the pilot spring 142 is separated away from a step portion between the second inner diameter portion 109 and the third inner diameter portion 110.

When the coil 126 is energized, the activation rod 130 is biased in such a direction that the valve body 103 is seated ("leftward direction" in FIG. 2), which brings the pilot spring 142 into abutment against the step portion between the second inner diameter portion 109 and the third inner diameter portion 110. The valve body 103 is seated on the seat portion 102 against the spring force of the pilot spring 142 and the fail-safe spring 143. A valve-opening pressure of the valve body 103 is controlled by changing a current value at which the coil 126 is energized. In a soft mode where the current value at which the coil 126 is energized is small, the spring force of the pilot spring 142 and a thrust force of the plunger 129 equal each other, and the valve body 103 comes into a position detached from the seat portion 102 (see FIG. 2).

Operation of the shock absorber 1 will be now discussed.

The shock absorber 1 is disposed between a sprung portion (vehicle body) and an unsprung portion (wheels) of a suspension device, not shown, in the vehicle. In a normal operation, an in-vehicle controller controls current flowing to the coil 126 of the solenoid 121 of the damping force adjustment mechanism 31, to thereby adjust the valve-opening pressure of the pilot valve 71.

During an expansion stroke of the piston rod 6, the check valve 13 of the piston 5 is closed due to a pressure increase within the cylinder's upper chamber 2A. Before the disc valve 14 is opened, the hydraulic fluid on the cylinder's upper chamber 2A side is pressurized. The pressurized hydraulic fluid passes through the path 22 and the annular channel 21 to be introduced into the damping force adjustment mechanism 31 from the connection 23 of the separator tube 20 (connecting pipe). At this moment, the hydraulic fluid in an amount equivalent to the displacement of the piston 5 flows out of the reservoir 4, opens the check valve 17 of the base valve 10, and flows into the cylinder's lower chamber 2B. When the pressure in the cylinder's upper chamber 2A reaches a valve-opening pressure of the disc valve 14 of the piston 5 to open the disc valve 14, the pressure in the cylinder's upper chamber 2A is released into the cylinder's lower chamber 2B. This prevents an excessive pressure increase in the cylinder's upper chamber 2A.

During a contraction stroke of the piston rod 6, a pressure increase within the cylinder's lower chamber 2B opens the check valve 13 of the piston 5 and closes the check valve 17 placed in the path 15 of the base valve 10. Before the disc valve 18 is opened, the hydraulic fluid in the cylinder's lower chamber 2B flows into the cylinder's upper chamber 2A, and the hydraulic fluid in an amount equivalent to a volume of a portion of the piston rod 6 which enters the cylinder 2 flows out of the cylinder's upper chamber 2A, passes through the path 22, the annular channel 21, and the connection 23 of the separator tube 20 (connecting pipe), and is introduced into the damping force adjustment mechanism 31. When the pressure in the cylinder's lower chamber 2B reaches a valve-opening pressure of the disc valve 18 of the base valve 10, and the disc valve 18 is opened, the pressure in the cylinder's lower chamber 2B is released into the reservoir 4. This prevents an excessive pressure increase in the cylinder's lower chamber 2B.

The hydraulic fluid introduced into the damping force adjustment mechanism 31 passes through the introduction orifice 94 formed in the pin portion 85 (pin member), the axial bore 93 of the pin portion 85, the recess portion 91 of the pilot casing 73, and the path 92, and flows into the annular recess portion 80. When the pressure acting in a direction opening the back-pressure introduction valve 81 exceeds a predetermined pressure, the hydraulic fluid opens the back-pressure introduction valve 81 to be introduced into the back-pressure chamber 72. Before the main valve 51 is opened (in a low piston speed region), the hydraulic fluid passes through the introduction orifice 94, the axial bore 93, the recess portion 91, and the axial bore 101 of the pilot body 74, opens the valve body 103 (pilot valve 71), and flows into the valve chamber 100 located in the pilot body 74.

After flowing into the valve chamber 100, the hydraulic fluid passes through a clearance between the valve body 103 and the fail-safe disc 144, the axial bore 119 of the washer 114, the notches 118 of the cap 116, the channel 37, the path 33 between the pilot casing 73 and the yoke 112 which is formed by the width across flats 89, the annular channel 35, and the outer periphery of the main body 52 and runs into the reservoir 4. When the piston speed is increased, and the pressure in the annular recess portion 55 in communication with the connection 23 through the path 59 reaches the valve-opening pressure of the main valve 51, the main valve 51 is opened. The hydraulic fluid in the annular channel 21 then passes through the connection 23, the path 59, the annular recess portion 55, and the main valve 51 and runs into the reservoir 4.

As described above, during both the expansion and contraction strokes of the piston rod 6, the damping force adjustment mechanism 31 generates a damping force using the introduction orifice 94 and the valve-opening pressure of the pilot valve 71 (valve body 103) before the opening of the main valve 51 (in the low piston speed region) and generates a damping force according to opening degree of the main valve 51 after the opening of the main valve 51 (in a medium piston speed region). The damping force adjustment mechanism 31 also controls the energization of the coil 126 to adjust the valve-opening pressure of the pilot valve 71. The damping force adjustment mechanism is thus capable of directly controlling the damping force, regardless of piston speed. Since the damping force adjustment mechanism 31 controls the energization of the coil 126 to adjust the valve-opening pressure of the pilot valve 71, the pressure of the hydraulic fluid introduced into the back-pressure chamber 72 is adjusted by opening the back-pressure introduction valve 81, which makes it possible to adjust damping force characteristics over a wide range.

If the thrust force of the plunger 129 is lost in the event of failure, such as disconnection of the coil 126 and malfunction of the in-vehicle controller, the spring force of the fail-safe spring 143 is used to retreat the valve body 103 and open the pilot valve 71, and the spring bearing portion 104 of the valve body 103 is brought into abutment against the fail-safe disc 144, to thereby block the communication between the valve chamber 100 and the annular channel 35 located inside the valve casing 25.

The flow of the hydraulic fluid which starts from the annular channel 21, passes through the introduction orifice 94, the axial bore 93, the recess portion 91, the axial bore 101 of the pilot body 74, the valve chamber 100, the axial bore 119 of the washer 114, the notches 118 of the cap 116, the channel 37, the path 33, the annular channel 35, and the outer periphery of the main body 52, and runs into the reservoir 4 is controlled by the fail-safe valve 141. During the control performed by the fail-safe valve 141, a desired damping force can be obtained by varying the valve-opening pressure of the fail-safe disc 144. It is also possible to adjust the inner pressure of the back-pressure chamber 72, that is, the valve-opening pressure of the main valve 51. Even if failure occurs, therefore, a proper damping force can be obtained in the above-described manner.

A procedure for fabricating the damping force adjustment mechanism 31 according to the first embodiment will be roughly discussed below.

First, the upstream valve component 42 (see FIG. 3), or in the first embodiment, the main body 52 (seat member), the main valve 51, the retainer 82, the spacer 83, the retainer 84, and the back-pressure introduction valve 81 are stacked on one side of the pilot casing 73. The pin portion 85 (pin member) formed integrally with the pilot casing 73 is inserted into the axial bore of the upstream valve component 42.

Secondly, the washer 88 is inserted into the pin portion 85, and the nut 87 (fastening member) screwed on the thread portion 86 of the pin portion 85 is rotated relative to the pin portion 85. The nut 87 is then fastened with given torque to clamp the upstream valve component 42 between the nut 87 (washer 88) and the inner peripheral portion 76 of the pilot casing 73, to thereby apply a given axial force to the upstream valve component 42. To fasten the nut 87 (rotate the nut 87 relative to the pin member), a tool is engaged with the width across flats 89 of the pilot casing 73.

The pilot spring 142, the fail-safe spring 143, the spacer 111, the fail-safe disc 144, the retainer 112, the spacer 113, and the washer 114 are stacked on the other side of the pilot body 74. The cap 116 is attached to the large outer diameter portion 115 on the other side of the pilot body 74. The downstream valve component 43 (see FIG. 3) is thus constructed. The small outer diameter portion 95 on one side of the pilot body 74 is fitted onto the inner peripheral surface 96 of the pilot casing 73. A valve assembly 41 (see FIG. 3) is thus constructed, in which the upstream valve component 42 and the downstream valve component 43 are coupled to be integrated with each other.

The thread portion 117 of the pilot casing 73 of the valve assembly 41 is then screwed with the thread portion 124 of the yoke 122. In this state, the pilot casing 73 and the yoke 122 are relatively rotated in the fastening direction to fasten the pilot casing 73 (valve assembly 41) and the yoke 122, to thereby apply a given axial force to the downstream valve component 43 between the pilot casing 73 and the yoke 122.

To fasten the pilot casing 73 and the yoke 122, a tool is engaged with the width across flats 89 of the pilot casing 73 and the width across flats 138 formed in the outer peripheral surface of the yoke 122. The solenoid internal components are beforehand secured in the yoke 122. The cylindrical portion 123 of the yoke 122 on which the valve assembly 41 is secured is fitted in the large inner diameter portion 26 of the valve casing 25. At the same time, the connection 23 of the separator tube 20 (connecting pipe) is inserted into and connected to the recess portion 56 on the one side of the main body 52. The nut 135 is attached and fastened onto the outer periphery of the valve casing 25 to compress the retaining ring 137 between the nut 135 and the yoke 122. The yoke 122 is thus fastened to the valve casing 25.

In connection with the foregoing process, a conventional shock absorber (see "Patent Literature 1") requires that a mounting member 2 including a mounting shaft 2c (corresponding to the "pin portion 85" of the first embodiment) provided with an orifice 2F (corresponding to the "introduction orifice 94" of the first embodiment) be machined to be provided with a tool engagement portion that is used only for rotating the mounting shaft 2c relative to the valve housing 4 (corresponding to the "pilot casing 73" of the first embodiment), and therefore requires man-hours for machining the mounting member 2.

In contrast, according to the first embodiment, the pin portion 85 (pin member) in which the introduction orifice 94 leading to the back-pressure chamber 72 is formed is disposed along the inner peripheries of the main body 52 (seat member), the main valve 51, and the pilot casing 73, and the nut 87 (fastening member) disposed in the pin portion 85 is rotated relative to the pin portion 85, to thereby fasten the main body 52, the main valve 51, and the pilot casing 73. This eliminates the necessity of machining a tool engagement portion in the pin portion 85 and represses an increase in man-hours.

The conventional shock absorber further requires that an insertion hole 4d (tool engagement portion) into which a tool is inserted when the valve housing 4 is secured to a second fixed core 73 ("yoke 122" of the first embodiment) and a groove 4i for forming a clearance (corresponding to the "path 33" of the first embodiment) between the valve housing 4 and the second fixed core 73 be separately machined in the valve housing 4. The conventional shock absorber thus requires man-hours for machining the mounting member 2.

In contrast, according to the first embodiment, the width across flats 89 formed in the outer peripheral surface of the pilot casing 73 can be used for two purposes, namely, the tool engagement portion for securing the pilot casing 73 to the yoke 122 and the pilot channel (path 33) between the pilot casing 73 and the yoke 122. Therefore, the machining of the tool engagement portion and the machining of the pilot channel require no more than a single process (requires a single machining process), which represses an increase in man-hours.

In the conventional shock absorber, a communication hole 4f (corresponding to the "path 92" of the first embodiment) for connecting an interior space of the valve housing 4 and the back-pressure chamber P is inclined to the axis (center line) of the valve housing 4. This complicates the machining and has been a factor in the increase of man-hours.

In contrast, according to the first embodiment, the path 92 for connecting the valve chamber 100 and the back-pressure chamber 72 is machined in parallel with the axis of the pilot casing 73. This lowers the level of difficulty of the machining and decreases man-hours and manufacturing costs.

According to the first embodiment, the pin portion 85 (pin member) in which the introduction orifice 94 leading to the back-pressure chamber 72 is formed is disposed along the inner peripheries of the main body 52 (seat member), the main valve 51, and the pilot casing 73. The pin portion 85 is provided with the nut 87 (fastening member) for fastening the main body 52, the main valve 51, and the pilot casing 73 together. It is therefore possible to omit a pilot pin interposed between a main body and a pilot casing (pilot body), which reduces the entire length (axial length) of the valve assembly 41, and therefore the entire length of the damping force adjustment mechanism 31. This offers a higher degree of freedom in design of a suspension device for a vehicle.

According to the first embodiment, the axial force is applied to the upstream valve component 42 alone. More specifically, since an axial force transmission route C1 (see FIG. 3) of the upstream valve component 42 is separated front an axial force transmission route C2 (see FIG. 3) of the downstream valve component 43, the valve component, or especially the main body 52 may be designed to have a lower rigidity, as compared to conventional shock absorbers (see Japanese Unexamined Patent Application Publication (Kokai) No. 2014-129842, for example) in which a main body and a pilot casing (pilot body) are coupled together with a pilot pin. The main body 52 therefore may be designed to have a small thickness (axial length), which reduces the length of the upstream valve component 42, and therefore the entire length of the damping force adjustment mechanism 31.

According to the first embodiment, the connection 23 of the separator tube 20 (connecting pipe) is fitted in the recess portion 56 of the main body 52, and the nut 87 (fastening member) is accommodated in the inside (inner periphery) of the connection 23. In other words, the nut 87 is arranged within an axial range (A1 in FIG. 3) of the separator tube 20 that is disposed between the cylinder 2 and the outer tube 3, so that the upstream valve component 42 is prevented from being increased in axial length depending on height of the nut 87.

According to the first embodiment, the pin portion 85 (pin member) is formed integrally with the pilot casing 73. This makes it possible to reduce the number of components and therefore decrease assembly man-hours.

Second Embodiment

A second embodiment will be now discussed with reference to FIGS. 4 and 5. Differences from the first embodiment will be discussed. Similar elements to the first embodiment are provided e same designations and reference signs as those of the first embodiment. The discussion omits redundant explanation.

According to the first embodiment, the nut 87 (fastening member) arranged in the axial area (A1 in FIG. 3) of the separator tube 20 (connecting pipe) that is disposed between the cylinder 2 and the outer tube 3. In contrast, according to the second embodiment, a nut 87 is arranged in an axial clearance (A2 in FIG. 5) between a pilot casing 73 and a pilot valve 71. In other words, according to the second embodiment as compared to the first embodiment, a recess portion 91 of the pilot casing 73 is formed deeper (larger in axial length) in order to accommodate the nut 87.

Figure 4:
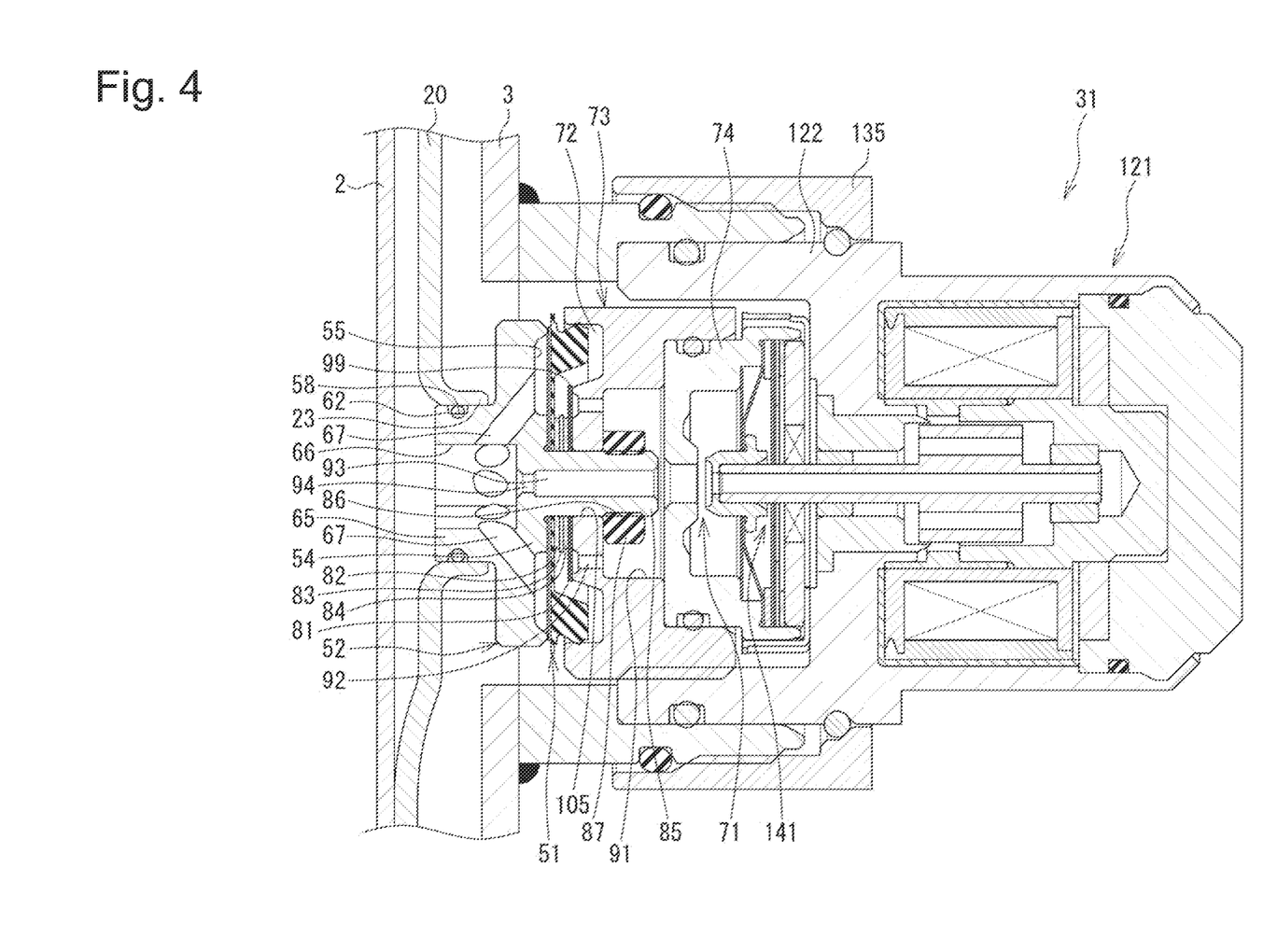
FIG. 4 is a sectional view of a damping force adjustment mechanism of a damping force adjustable shock absorber according to a second embodiment.
Figure 5:
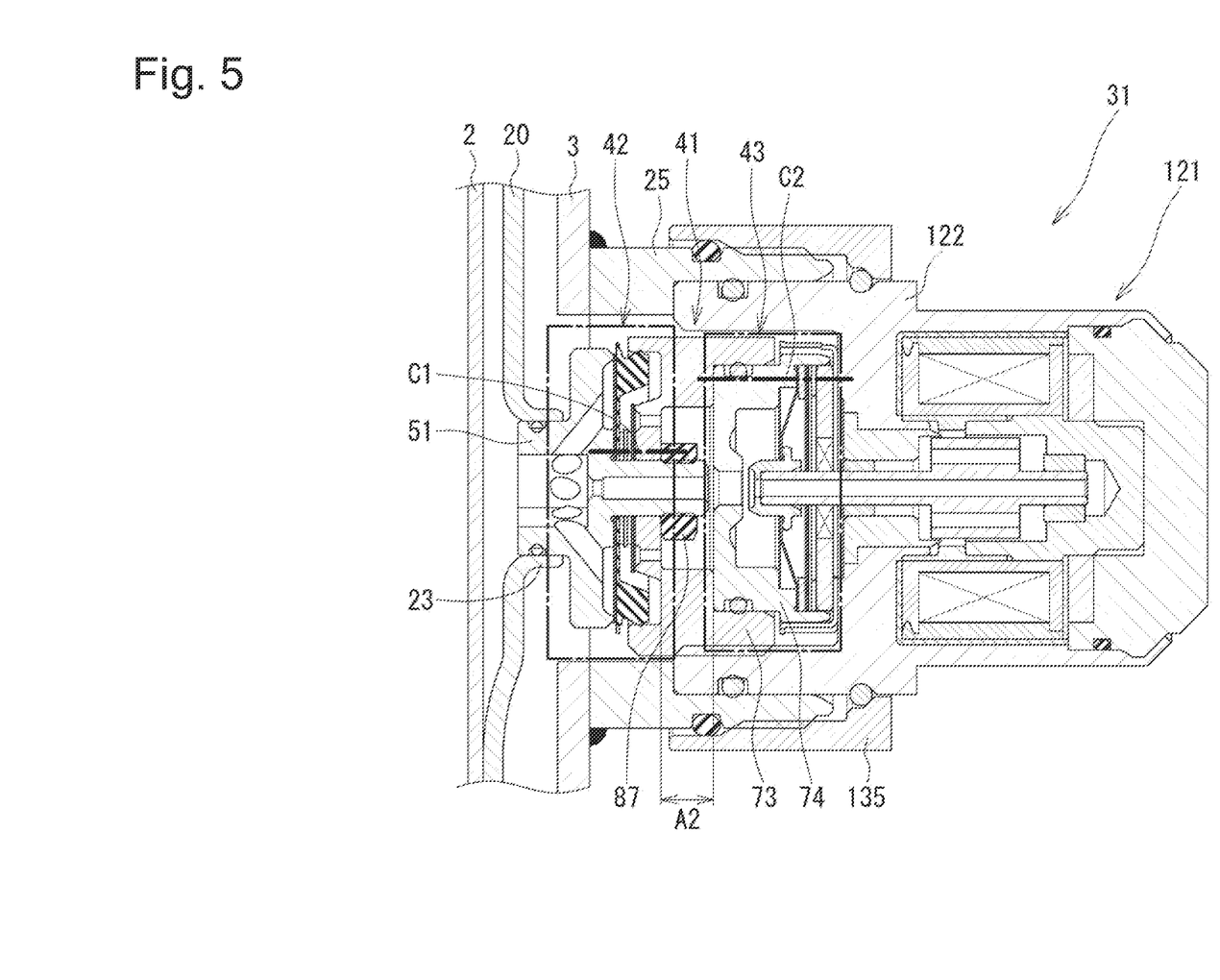
FIG. 5 is an explanatory view of the second embodiment which shows upstream and downstream valve components.

As illustrated in FIG. 4, a pin portion 85 is disposed coaxially with a main body 52 (seat member) and protrudes from the main body 52 to the pilot valve 71 side (rightward direction in FIG. 4). The pin portion 85 extends through an axial bore 105 of the pilot casing 73. The other side end portion (distal end portion) of the pin portion 85 is located inside the recess portion 91 of the pilot casing 73. A thread portion 86 is formed in the other side end portion of the pin portion 85. The nut 87 (fastening member) is screwed on the thread portion 86. In short, the nut 87 is accommodated in the recess portion 91 of the pilot casing 73. The pin portion 85 may be a separate member from the main body 52. In such a case, the pin portion 85 (pin member) is press-fitted into an axial bore (see "reference sign 61" in FIG. 2) which is formed in the main body 52. This way, the main body 52 and the pin portion 85 are formed in an integral manner.

The nut 87 screwed on the thread portion 86 is fastened (rotated relative to the pin member), to thereby apply an axial force to an upstream valve component 42 (see FIG. 5) located between the main body 52 and the nut 87, or in the second embodiment, a main valve 51, a retainer 82, a spacer 83, a retainer 84, a back-pressure introduction valve 81, and the pilot casing 73. To fasten the nut 87, a tool is engaged with a recess portion 66 that is formed in a one side end surface of the main body 52. The recess portion 66 is formed to have a regular hexagonal cross-section along a plane perpendicular to the axis, and a hexagonal wrench can be engaged therewith. The recess portion 66 is in communication with a back-pressure chamber 72 through an introduction orifice 94, an axial bore 93 of the pin portion 85, the recess portion 91 of the pilot casing 73, a path 92, and the back-pressure introduction valve 81 (orifice 99).

Formed in one side of the main body 52 is a connecting portion 65 that is fitted (inserted) into a connection 23 of a separator tube 20. An annular groove 62 is formed in an outer peripheral surface of the connecting portion 65 of the main body 52. A gap between the connecting portion 65 of the main body 52 and the connection 23 of the separator tube 20 is sealed by a seal ring 58 that is attached in the annular groove 62. A plurality of ("six" in the second embodiment) paths 67 is also formed in the main body 52. The plurality of paths 67 connects the recess portion 66 located on one side and an annular recess portion 55 on the other side.

A procedure for fabricating a damping force adjustment mechanism 31 according to the second embodiment will be roughly discussed below.

First, the upstream valve component 42 (see FIG. 5), or in the second embodiment, the main valve 51, the retainer 82, the spacer 83, the retainer 84, the back-pressure introduction valve 81, and the pilot casing 73 are stack on the other side of the main body 52. The pin portion 85 (pin member) formed integrally with the main body 52 is inserted into an axial bore of the upstream valve component 42.

Secondly, the nut 87 (fastening member) is screwed on the thread portion 86 of the pin portion 85. The nut 87 is then fastened with given torque to clamp the upstream valve component 42 between the nut 87 and an inner peripheral portion 54 of the main body 52, to thereby apply a given axial force to the upstream valve component 42. To fasten the nut 87, a tool ("hexagonal wrench," for example) is engaged with the recess portion 66 located on one side of the main body 52.

The second embodiment provides equivalent operation and advantageous effects to the first embodiment.

The first and second embodiments use the nut 87 as a fastening member. The nut 87, however, may be replaced with another means, such as swaging, as long as the alternative means can apply the given axial force to the upstream valve component 42.

The invention is not limited to the embodiments discussed above and may be modified in various manners. For example, the embodiments are discussed to clearly describe the invention in details and do not necessarily have to include all the configurations mentioned above. It is possible to partially replace the constitution of any of the embodiments with that of another embodiment and also incorporate the constitution of any of the embodiments into that of another embodiment. The constitution of any of the embodiments may be partially combined or replaced with the constitution of another embodiment or may be deleted.

The present patent application claims priority under Japanese Patent Application No. 2020-023409 filed on Feb. 14, 2020. The entire disclosure of Japanese Patent Application No. 2020-023409 filed on Feb. 14, 2020 including the description, claims, drawings and abstract is incorporated herein by reference in its entirety.

REFERENCE SIGNS LIST

1 Shock absorber, 2 Cylinder, 3 Outer tube, 4 Reservoir, 5 Piston, 20 Separator tube (connecting pipe), 31 Damping force adjustment mechanism, 51 Main valve, 52 Main body (seat member), 71 Pilot valve, 72 Back-pressure chamber, 73 Pilot casing, 85 Pin portion (pin member), 93 Axial bore (introduction path), 87 Nut (fastening member)

The invention claimed is:

1. A shock absorber comprising:
a cylinder in which a hydraulic fluid is sealed;
a piston inserted in the cylinder to define two chambers within the cylinder;
an outer tube disposed around an outer periphery of the cylinder;
a reservoir formed between the cylinder and the outer tube, the reservoir in which the hydraulic fluid and a gas are sealed;
a connecting pipe disposed between the cylinder and the outer tube and communicating into the cylinder; and
a damping force generation mechanism accommodated in a valve casing disposed on an outside of the outer tube, the damping force generation mechanism being connected to the connecting pipe,
the damping force generation mechanism including:
a main valve configured to generate a damping force;
a seat member which the main valve abuts;
a pilot casing that forms a back-pressure chamber formed on a back side of the main valve and having inner pressure that acts on the main valve in a valve-closing direction;
a pilot valve configured to adjust the inner pressure of the back-pressure chamber; and
a pin member that is disposed along inner peripheries of the seat member, the main valve, and the pilot casing, the pin member in which an introduction orifice leading to the back-pressure chamber is formed,
the pin member being provided with a fastening member that is rotated relative to the pin member to fasten the seat member, the main valve, and the pilot casing together,
the fastening member being disposed in an axial clearance between the pilot casing and the pilot valve.

2. The shock absorber according to claim 1, wherein a plurality of chamfered portions is formed in an outer peripheral side of the pilot casing.

3. The shock absorber according to claim 1, wherein the pin member is formed integrally with the seat member.

4. The shock absorber according to claim 1, wherein the pilot casing is provided with a check valve that allows a hydraulic fluid to flow toward the back-pressure chamber according to pressure on a downstream side of the introduction path and on an upstream side of the pilot valve.

5. A solenoid valve comprising:
a main valve configured to generate a damping force;
a seat member which the main valve abuts;
a pilot casing that forms a back-pressure chamber formed on a back side of the main valve and having inner pressure that acts on the main valve in a valve-closing direction;
a pilot valve configured to adjust the inner pressure of the back-pressure chamber using the solenoid valve; and
a pin member that is disposed along inner peripheries of the seat member, the main valve, and the pilot casing, the pin member in which an introduction orifice leading to the back-pressure chamber is formed,
the pin member being provided with a fastening member that is rotated relative to the pin member to fasten the seat member, the main valve, and the pilot casing together, the fastening member being disposed between an axial clearance between the pilot casing and the pilot valve.

* * * * *